US008331298B2

(12) United States Patent
Yeh et al.

(10) Patent No.: US 8,331,298 B2
(45) Date of Patent: Dec. 11, 2012

(54) STRUCTURE AND CONSTRUCTION METHOD OF UPLINK CONTROL CHANNEL IN MOBILE WIDEBAND WIRELESS ACCESS SYSTEM

(75) Inventors: Choong-Il Yeh, Daejeon (KR); Dong-Seung Kwon, Daejeon (KR); Jee-Hwan Ahn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 754 days.

(21) Appl. No.: 12/518,027

(22) PCT Filed: Dec. 7, 2007

(86) PCT No.: PCT/KR2007/006375
§ 371 (c)(1),
(2), (4) Date: Jun. 5, 2009

(87) PCT Pub. No.: WO2008/069624
PCT Pub. Date: Jun. 12, 2008

(65) Prior Publication Data
US 2010/0322160 A1 Dec. 23, 2010

(30) Foreign Application Priority Data
Dec. 8, 2006 (KR) .................. 10-2006-0124573

(51) Int. Cl.
*H04W 4/00* (2009.01)
(52) U.S. Cl. ........................................... 370/329
(58) Field of Classification Search ............. 370/329; 455/450–509
See application file for complete search history.

(56) References Cited

U.S. PATENT DOCUMENTS

| | | | |
|---|---|---|---|
| 6,714,511 B1 | 3/2004 | Sudo et al. | |
| 2003/0081538 A1 | 5/2003 | Walton et al. | |
| 2005/0030931 A1 | 2/2005 | Sung et al. | |
| 2006/0087961 A1 | 4/2006 | Chang et al. | |
| 2006/0153060 A1 | 7/2006 | Cho | |
| 2006/0171417 A1 | 8/2006 | Ihm et al. | |
| 2007/0281654 A1* | 12/2007 | Choi | 455/277.1 |
| 2008/0056193 A1* | 3/2008 | Bourlas et al. | 370/331 |
| 2008/0101306 A1* | 5/2008 | Bertrand et al. | 370/336 |
| 2011/0317608 A1* | 12/2011 | Li et al. | 370/312 |

FOREIGN PATENT DOCUMENTS

| | | |
|---|---|---|
| KR | 10-2005-0015119 A | 2/2005 |
| KR | 10-2006-0035939 A | 4/2006 |
| KR | 10-2006-0046677 A | 5/2006 |
| KR | 10-0589898 B1 | 6/2006 |
| KR | 10-2006-0074795 A | 7/2006 |
| WO | 2006/107135 A1 | 10/2006 |

* cited by examiner

*Primary Examiner* — Mark Rinehart
*Assistant Examiner* — Mang Yeung
(74) *Attorney, Agent, or Firm* — Jefferson IP Law, LLP (57) ABSTRACT

The present invention relates to an uplink control channel configuration in a mobile wideband wireless access system, and an allocation method thereof. An uplink control channel includes a long cyclic prefix used to improve interference and distortion caused by multipath transmission characteristics of an initial ranging or handover ranging signal and a periodic ranging or band request ranging signal. In addition, a short orthogonal frequency division multiple (OFDM) symbol is used to transmit uplink control information when one terminal exists or the number of terminals is small.

12 Claims, 6 Drawing Sheets

STRUCTURE AND CONSTRUCTION METHOD OF UPLINK CONTROL CHANNEL IN MOBILE WIDEBAND WIRELESS ACCESS SYSTEM

TECHNICAL FIELD

The present invention relates to an uplink control channel configuration and an uplink control channel allocation method in a mobile wideband wireless access system. More particularly, the present invention relates to an uplink control channel configuration and an uplink control channel allocation method in a mobile wideband wireless access system in an orthogonal frequency division multiple access (OFDMA) method.

BACKGROUND ART

In a wireless transmission system including a plurality of terminals and at least one base station having functions such as a handover function, types of information uplink-transmitted by a terminal are classified into traffic information and control information. The traffic information includes user data, and the control information includes information on system operation, base station scheduling, automatic request (ARQ), multiple input multiple output (MIMO), adaptive modulation and coding (AMC), power control, uplink synchronization, terminal resource allocation request, and random access functions.

The amount of resources required to transmit the uplink control information by the respective terminals is less than that required to transmit the traffic information, but types of control information are various and they are frequently transmitted. Therefore, to transmit the control information to the base station, a considerable amount of bandwidth and complicated processes are required. Accordingly, a method for transmitting the control information and a method for allocating resources for the control information transmission are required to be differently designed from the traffic information transmission, and a method for selecting the control information transmission method by the terminal may considerably affect system performance.

The ranging information among the control information is used to adjust uplink time synchronization and power. Six subchannels form a basic unit when the base station allocates the resources for transmitting the ranging information by using a partial usage subchannel (PUSC) method (one of OFDMA resource allocation methods by the IEEE 802.16), and 8 subchannels form the basic unit when the base station allocates the resources for transmitting the ranging information by using an optional PUSC method. In the PUSC, a subchannel is formed by randomly selecting 6 tile configurations from the entire band, in which one tile configuration is defined by four neighboring sub-carriers and three neighboring symbols. In the optional PUSC, a sub channel is formed by randomly selecting 8 tile configurations, in which one tile configuration is formed by three neighboring subcarriers and three neighboring symbols. Accordingly, the basic unit for transmitting ranging information includes 144 subcarriers defined in 3 symbols.

Among the three symbols, the first two symbols are used to transmit an initial ranging signal or a handover ranging signal, and the other symbol is used to transmit a periodic ranging signal or a band request ranging signal.

Since the terminal transmits a pseudo random noise (PN) code with a length of 144 subcarriers to perform an initial ranging or handover ranging operation by using a channel allocated by the base station, the base station may discern pieces of ranging information when the pieces of ranging information are simultaneously transmitted by using the same channel.

In addition, since the initial ranging or handover ranging signal is transmitted while uplink synchronization is not yet obtained, the first symbol uses a cyclic prefix and the second symbol uses a cyclic postfix to sequentially transmit the same code. Further, since the periodic ranging or band request ranging signal is transmitted while the uplink synchronization is obtained, the signal is transmitted by using 144 subcarriers of the third symbol among the symbols allocated to perform the ranging operation by the base station.

Uplink ACK/NACK information among the control information is used to perform an ARQ operation for a downlink (DL) packet or a hybrid automatic repeat request (H-ARQ) operation. The terminal uses the tile configuration allocated in the optional PUSC method by the base station to uplink-transmit the ACK or NACK signal.

Figure 1:
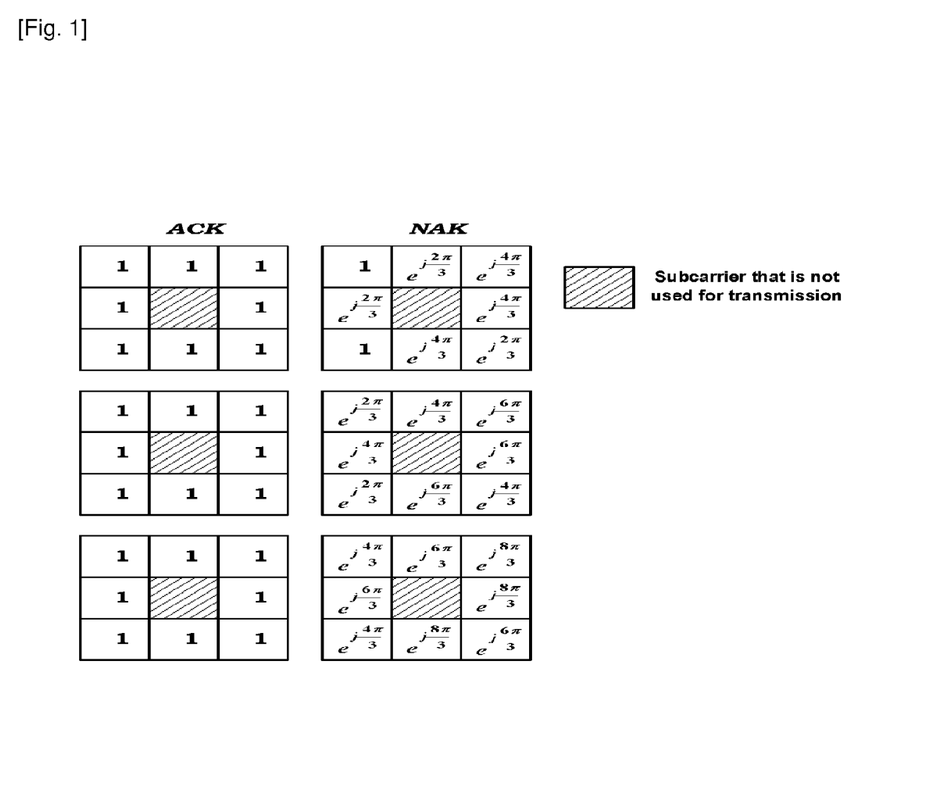
FIG. 1 is a diagram representing a conventional ACK/NACK code configuration method.

FIG. 1 is a diagram representing a conventional ACK/NACK code configuration method.

Referring to FIG. 1, ACK/NACK codes are formed in code columns perpendicularly crossing each other, and an ACK or NACK state is determined by correlation.

Uplink channel sounding information among the control information is defined to support closed-loop MIMO. When a transmitter (generally, a transmitter at the base station) knows channel information (i.e., downlink channel information when the transmitter is at the base station), frequency usage efficiency may be increased by using a precoding method. There are two methods for providing the downlink information to the base station by the terminal.

In one of the two methods, a common preamble or pilot signal is transmitted so that the base station may discern transmitting antennas, and the terminal uses it to measure a downlink channel and uses an uplink control channel to report the downlink channel to the base station. In the other of the two methods, the terminal transmits the uplink channel sounding information, the base station uses it to measure the uplink channel, and the base station acknowledges the downlink channel by using a reversible channel characteristic in a time division duplex (TDD) method. In the IEEE 802.16 OFDMA, a predetermined number of uplink symbols are used to transmit the channel sounding signal.

Figure 2:
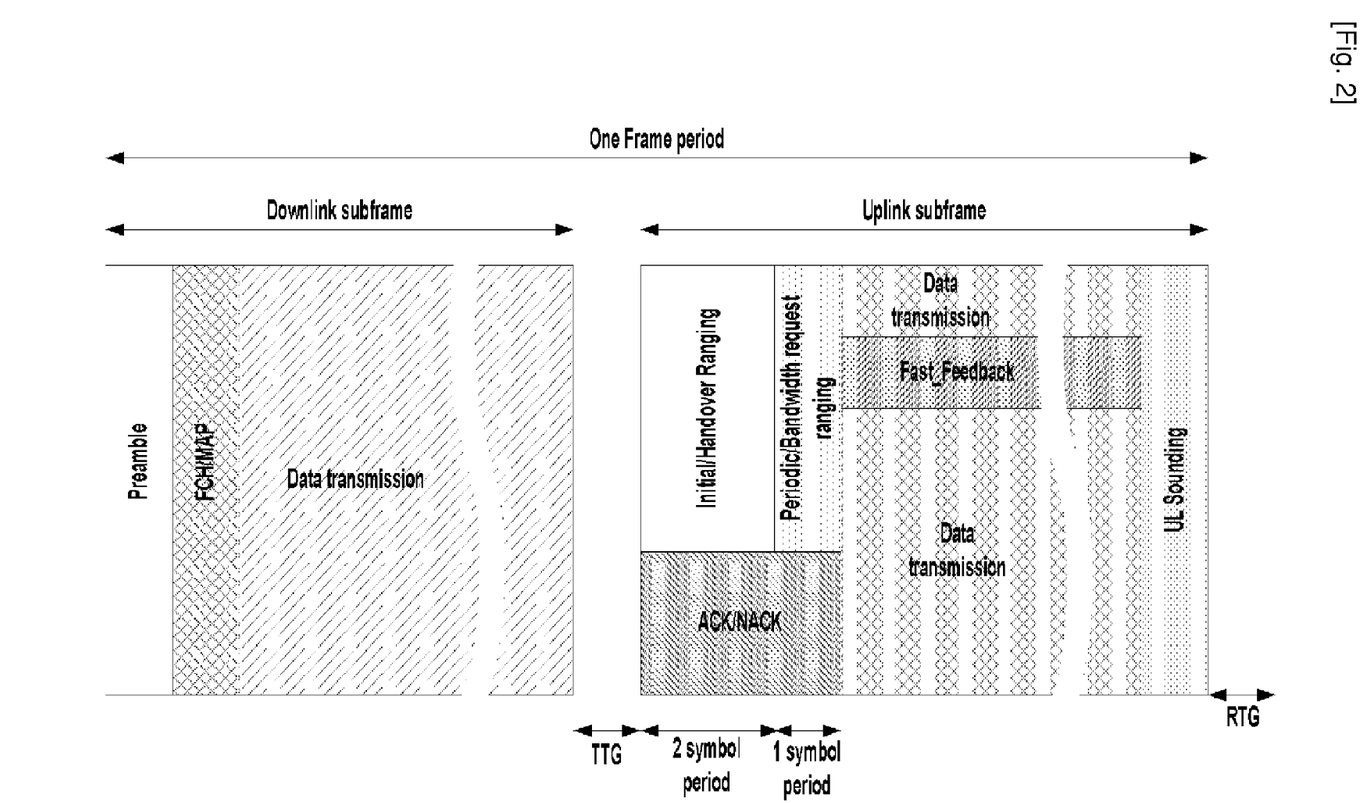
FIG. 2 is a diagram representing a frame configuration and an uplink control channel configuration in a conventional orthogonal frequency division multiple access (OFDMA) time division duplex (TDD) system.

FIG. 2 is a diagram representing a frame configuration and an uplink control channel configuration in a conventional OFDMA TDD system.

Referring to FIG. 2, the horizontal axis indicates times divided by OFDM symbols and the vertical axis indicates frequencies divided by subchannels. Various pieces of uplink control information required to operate a channel quality indicator and the MIMO are defined to be transmitted by using fast feedback resources.

Figure 3:
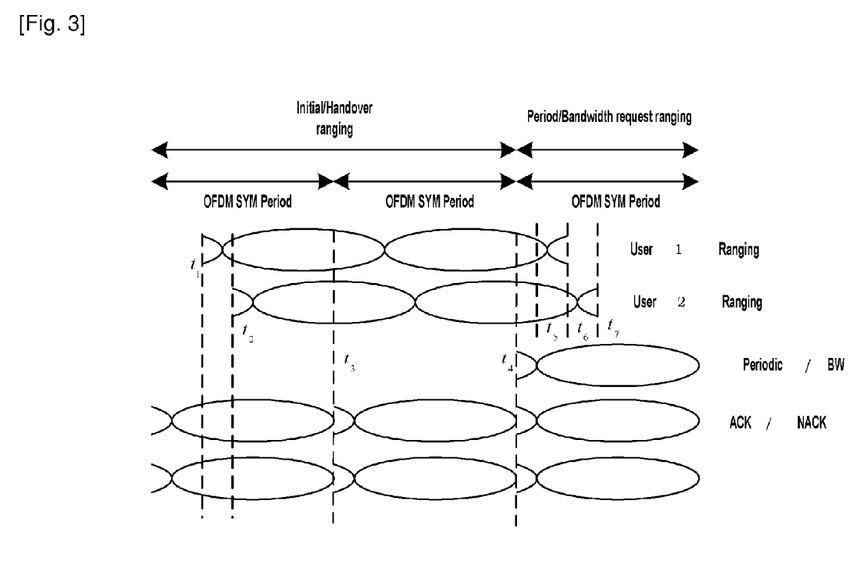
FIG. 3 is a diagram representing inter-carrier interference (ICI) and inter-symbol interference (ISI) generated on a ranging channel and a ACK/NACK channel when initial and handover ranging operations are performed according to IEEE 802.16.

FIG. 3 is a diagram representing inter-carrier interference and inter-symbol interference generated on the ranging channel and the ACK/NACK channel when the initial and handover ranging operations are performed according to IEEE 802.16.

When the terminal uses the first three OFDM symbols of an uplink frame to transmit the ranging information and the ACK/NACK information, the information is transmitted without obtaining the uplink synchronization, and periodic ranging, band request ranging, and ACK/NACK control signals are transmitted while the uplink synchronization is obtained.

Referring to FIG. 2, the same subcarrier is allocated to transmit the initial ranging, handover ranging, periodic ranging, and band request ranging information. Therefore, in FIG. 3, since the initial ranging or handover ranging signal in sections $t_5$ to $t_7$ of the third OFDM symbol affects the periodic ranging or band request ranging signal transmitted in the third symbol as the ISI, periodic ranging or band request ranging performance is deteriorated. In addition, since the periodic ranging signal or band request ranging signal in the section $t_5$ to $t_7$ of the third OFDM symbol affects the initial ranging signal or handover ranging signal transmitted in the second symbol as the ISI, receiving performance of the initial ranging signal or handover ranging signal is deteriorated.

Further, sudden changes of the initial ranging and handover ranging signals generated in the sections $t_1$, $t_2$, $t_6$, and $t_7$ cause a spectral emission effect, which affects the ranging signal and the ACK/NACK signal as the ICI, and therefore receiving performance is deteriorated. The sudden changes of the periodic ranging signal or band request ranging signal and the ACK/NACK signal in the section $t_3$ and $t_4$ cause the spectral emission effect, which affects the initial ranging and handover ranging signals as the ICI, and therefore the receiving performance is deteriorated.

In the above uplink channel allocation method, since the uplink channel sounding signal is transmitted by using one entire OFDM symbol as shown in FIG. 2 when the uplink channel is allocated to one user, resources may be problematically wasted.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem since the uplink channel sounding signal is transmitted by using one entire OFDM symbol when the uplink channel is allocated to one user, resources may be problematically wasted.

Technical Solution

The present invention has been made in an effort to provide an uplink control channel allocation method for improving inter-symbol interference (ISI) and inter-carrier interference (ICI), reducing wasted resources, and increasing resource allocation efficiency.

An exemplary uplink control channel configuration according to an embodiment of the present invention includes a first long cyclic prefix, a first valid symbol, a second long cyclic prefix, and a second valid symbol. The first long cyclic prefix prevents interference distortion of an initial ranging signal or a handover ranging signal. The first valid symbol is provided after the first long cyclic prefix, and is used to transmit the initial ranging signal or the handover ranging signal. The second long cyclic prefix is provided after the valid symbol, and is used to prevent interference distortion of the initial ranging signal or the handover ranging signal and a periodic ranging signal or a band request ranging signal. The second valid symbol is provided after the second long cyclic prefix, and is used to transmit the periodic ranging signal or the band request ranging signal.

In an exemplary uplink control channel allocation method according to an embodiment of the present invention, a) a first long cyclic prefix for preventing interference distortion of an initial ranging signal or a handover ranging signal is allocated, a first valid symbol that is provided after the first long cyclic prefix and that corresponds to the initial ranging signal or the handover ranging signal is allocated, a second long cyclic prefix that is provided after the first valid symbol, and that is used to prevent interference distortion of the initial ranging signal or the handover ranging signal and a periodic ranging signal or a band request ranging signal is allocated, and a second valid symbol that is provided after the second long cyclic prefix and that corresponds to the periodic ranging signal or the band request ranging signal is allocated.

In an exemplary uplink channel allocation method according to another embodiment of the present invention, lengths of valid symbols are differently established according to types of uplink control information, and a subcarrier corresponding to a length of a valid symbol is modulated according to the uplink control information.

Advantageous Effects

According to the exemplary embodiment of the present invention, when the uplink control channel is formed as described above, since the ISI and the ICI generated in the conventional ranging method is eliminated, ranging performance may be improved and the detection performance may be improved.

In addition, since the short OFDM symbol is used to allocate the uplink channel sounding information, the short OFDM symbol is used, differing from the conventional method in which one IFDM symbol is allocated when the number of terminals requiring resource allocation for transmitting the control information such as the uplink channel sounding information is small, and therefore resource allocation efficiency may be improved.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word 'comprise' and variations such as 'comprises' or 'comprising' will be understood to imply the inclusion of stated elements but not the exclusion of any other elements.

An uplink frame configuration method according to an exemplary embodiment of the present invention will be described with reference to the figures.

Figure 4:
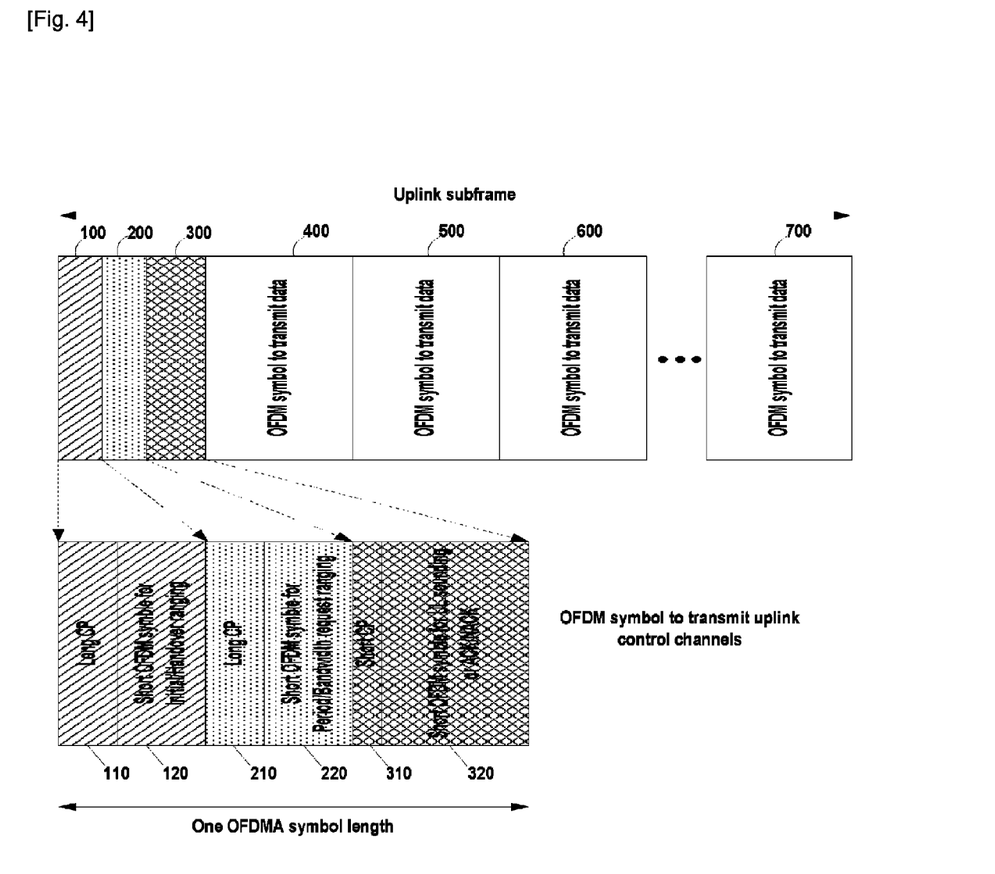
FIG. 4 is a diagram representing an uplink frame configuration in a mobile wideband wireless access system according to an exemplary embodiment of the present invention.

FIG. 4 is a diagram representing an uplink frame configuration in a mobile wideband wireless access system according to the exemplary embodiment of the present invention.

In the exemplary embodiment of the present invention, terminals use a short orthogonal frequency division multiple (OFDM) symbol to transmit a control channel to a base station. The short OFDM symbol is differently formed according to a method using subcarriers. For example, one subcarrier among n subcarriers is modulated and remaining subcarriers are modulated as null values to form the short OFDM symbol having a length that is reduced by 1/n. In this case, n is a symbol length reduction ratio.

In addition, as shown in FIG. 4, an uplink control channel includes three short OFDM symbols 100, 200, and 300, and traffic transmission channels 400, 500, 600, and 700 have conventional OFDM symbol lengths.

A control channel configuration among an uplink frame according to the exemplary embodiment of the present invention will now be described. The detailed configuration method of the traffic transmission channel departs from the subject matter of the present invention, and thus the description thereof will be omitted.

The first OFDM symbol 100 includes a long cyclic prefix Long CP 110 that is inserted to prevent interference between OFDM symbols and a short valid symbol 120 for actually transmitting data that is allocated to transmit initial ranging and handover ranging signals.

The second OFDM symbol 200 includes a long cyclic prefix Long CP 210 and a short valid symbol 220 for actually transmitting the ranging signal, which are allocated to transmit periodic ranging and band request ranging signals.

Differing from a conventional CP that is designed by considering delay spread, the long CPs 110 and 210 of the first and second OFDM symbols 100 and 200 are designed to have a length that is sufficient to eliminate inter-symbol interference (ISI) and inter-carrier interference (ICI) by considering round trip delay and delay spread.

In addition, since the valid symbols 120 and 220 of the first and second OFDM symbols 100 and 200 use one subcarrier among the eight subcarriers, the valid symbols 120 and 220 are formed by the short OFDM symbols with a length of ⅛ of that of the conventional valid symbol.

Further, in the exemplary embodiment of the present invention, it is illustrated that the valid symbols 120 and 220 of the first and second OFDM symbols 100 and 200 use the short OFDM symbol having a length that is ⅛ of that of the conventional valid symbol, but it is not limited thereto, and the valid symbol may be variously designed according to system characteristics. Here, the conventional valid symbol may be used in the exemplary embodiment of the present invention.

The third OFDM symbol 300 includes a short CP 310 of the same length as the conventional OFDM symbol for transmitting traffic information and a short valid symbol 320, which are allocated to transmit ACK/NACK information or uplink channel sounding information. The same short CP as the conventional CP is used since the second OFDM symbol 200, unlike the first OFDM symbol 100, includes ranging information obtained while synchronization is obtained and the second OFDM symbol 200 does not affect a subsequent OFDM symbol as the ISI.

In addition, in the exemplary embodiment of the present invention, since the short valid symbol 320 of the third OFDM symbol 300 uses one subcarrier among the 2 sub-carriers differing from the short valid symbols 120 and 220, the short valid symbol 320 has ½ the length of the conventional valid symbol. However, the valid symbol of the third OFDM symbol may be variously set according to the system characteristics in a like manner of the first and second OFDM symbols.

A method for allocating the short OFDM symbol 320 not only used to allocate resources for transmitting the uplink channel sounding information, but is also used to transmit other uplink control information. In addition, the method may vary according to the uplink control information to be transmitted.

When uplink resources are received to perform a ranging operation as described above, a ranging operation in a like manner of a conventional IEEE 802.16 OFDMA system may be supported in the exemplary embodiment of the present invention since the ranging information is transmitted after being modulated as a pseudo random noise (PN) code. In addition, in the exemplary embodiment of the present invention, since the length of the CP is designed to be sufficiently long, the ISI and the ICI generated by transmitting the initial ranging and handover ranging signals without obtaining the uplink synchronization in the conventional OFDMA system may be eliminated. Further, since the ISI and the ICI may be eliminated, accuracy of data transmission is increased and detection performance may be improved.

Still further, since the short OFDM symbol is used to transmit the uplink control information that is the same as the uplink channel sounding information, the short OFDM symbol is used when one terminal exists, differing from a conventional method in which one OFDM symbol is allocated, and therefore resource allocation efficiency is improved.

In the above uplink frame, the short OFDM symbol 320 is used to transmit the ACK/NACK information. A transmission method for transmitting the ACK/NACK information and a detection method according to the transmission method will now be described.

Firstly, in the transmission method for transmitting the ACK/NACK information, a PN code used as ACK and a PN code used as NACK are defined in a base station and a terminal. For example, firstly, M PN codes are defined. Among the M PN codes, PN codes having indexes of (1–M/2) are set as the ACK information, PN codes having indexes of (M/2+1~M) are set as NACK information, and a downlink (DL) packet and the PN code are correlated.

That is, when the PN code corresponding to the DL packet of index 1 is defined as the PN code of index 1 or index M/2+1, the PN code of index 1 corresponding to the ACK is transmitted when the terminal appropriately receives the DL packet of index 1, and the PN code of index M/2+1 corresponding to the NACK is transmitted when the terminal does not appropriately receive the DL packet of index 1.

A method for detecting the uplink frame (particularly, the ACK/NACK information) by the base station will be described with reference to the figures.

Figure 5:
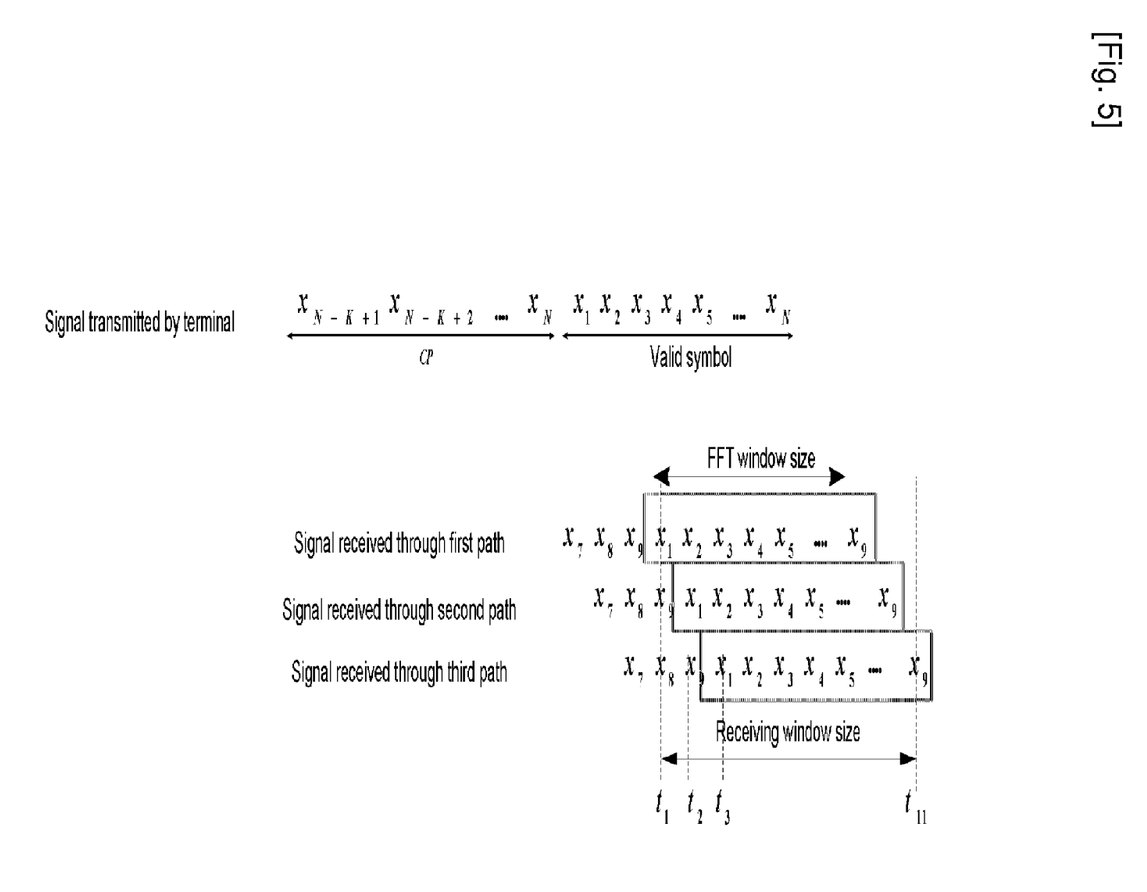
FIG. 5 is a diagram representing a method for detecting ACK/NACK information by a base station when an uplink frame according to the exemplary embodiment of the present invention is transmitted.

FIG. 5 is a diagram representing the method for detecting the ACK/NACK information by the base station when the uplink frame according to the exemplary embodiment of the present invention is transmitted.

Referring to FIG. 5, a first signal is a waveform at a time domain when the terminal uses the PN code to transmit the ACK or NACK information, and the first signal includes N valid symbols and K CPs. Second, third, and fourth signals are signals received through three paths when N=9 and K=3, wherein the second signal is received through a first path, the third signal is received through a second path, and the fourth signal is received through a third path.

Accordingly, as shown in FIG. 5, the base station considers propagation delay caused by multipath propagation, and sets a receiving window size for detecting a transmission response (ACK/NACK) signal regarding the downlink packet to be greater than a valid symbol period in which the data are actually transmitted, that is, to be greater than a fast Fourier transform (FFT) window size for demodulating the transmitted data. In this case, a length of the CP is used as a reference for considering the propagation delay.

Figure 6:
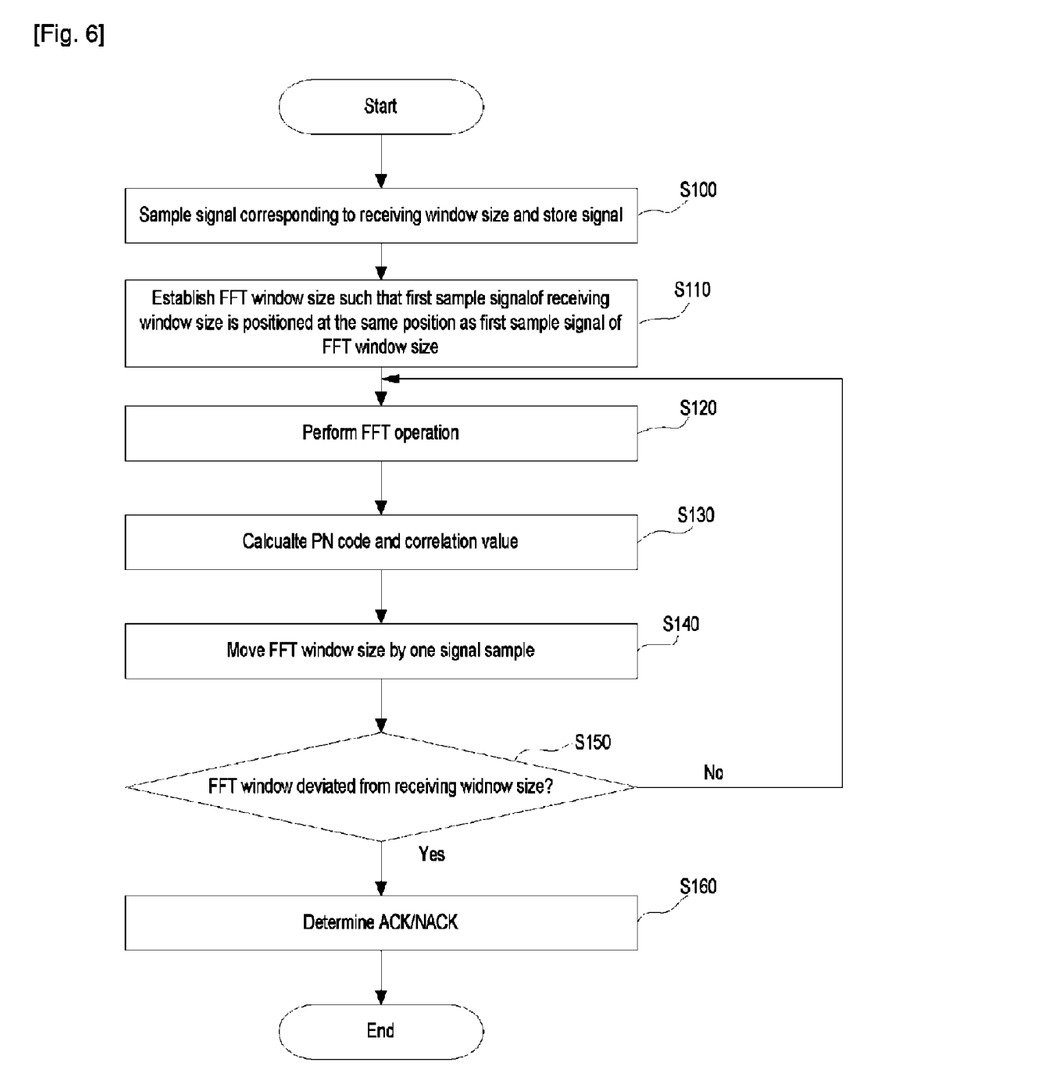
FIG. 6 is a flowchart representing a method for detecting a transmission response (ACK/NACK) signal regarding a downlink packet in the uplink frame by the base station.

FIG. 6 is a flowchart representing a method for detecting the transmission response (ACK/NACK) signal regarding the downlink packet in the uplink frame by the base station.

Referring to FIG. 6, the base station considers the propagation delay caused by the multipath propagation as described in FIG. 5 and establishes the receiving window size.

When the terminal transmits the ACK or NACK information regarding the download packet, the base station receives the ACK or NACK information, samples a signal corresponding to the receiving window size based on radio resources allocated for the ACK/NACK information transmission, and stores the signal in step S100. Referring back to FIG. 5, the base station establishes the receiving window size to have 11 sample lengths according to the actual valid symbol and the number of samples of the CP, and stores the sample signal of $t_1$ to $t_{11}$.

Subsequently, the base station establishes the FFT window size corresponding to the number of samples of the actual valid symbols, establishes the FFT window size such that a first sample signal of the receiving window size is positioned at the same position as a first sample signal of the FFT window size in step S110, and performs an FFT operation in step S120. That is, the size of $t_1$ to $t_9$ is set as the FFT window size, and the FFT operation is performed.

Subsequently, a correlation value of the FFT operation result and the PN code allocated for the ACK/NACK is calculated and stored in step S130. In this case, the number of correlation values corresponding to one FFT window varies according to the number of DL packets required for the ACK or NACK. When the number of DL packets required for the ACK or NACK is L, the number of correlation values corresponding to one FFT window is 2L, which follows the PN code allocation method corresponding to the ACK/NACK.

In addition, when the correlation value is calculated in step S130, a number K of FFT operations is performed for one receiving window, the correlation values for 2L PN codes may be obtained for each FFT operation, and therefore the base station may detect the ACK/NACK by using Equation 1. Here, the PN code index for the ACK/NACK corresponding to an $n^{th}$ DL packet is defined as n,M/2+n.

$$ACK \text{ if } \frac{\max(V_i^n)}{\max(V_i^{n+\frac{M}{2}+1})} \geq 1 \qquad \text{[Equation 1]}$$

$$NACK \text{ if } \frac{\max(V_i^n)}{\max(V_i^{n+\frac{M}{2}+1})} < 1$$

Here, $V^n_i$ denotes a correlation value of the PN code having an index n in an $i^{th}$ FFT window, and i is given as $1 \leq i \leq K$.

In addition, after calculating the correlation value of the FFT operation result of the first FFT window and the 2L PN codes, the FFT window size is reestablished to be $t_2$ to $t_{10}$ in step S140.

Subsequently, the above steps S120, S130, and S140 are repeatedly performed before the FFT window is deviated from the receiving window size in step S150. In FIG. 5, since the length of the CP is established by three signal samples, the FFT windows are $t_1\sim t_9$, $t_2\sim t_{10}$, $t_3\sim t_{11}$ and $t_4\sim t_{12}$.

After calculating correlation values for all the signal samples of the receiving window size, a maximum correlation value for each PN code is calculated, and a maximum correlation value of the ACK or NACK information regarding a predetermined DL packet is compared to determine the ACK or NACK.

In the above ACK/NACK detection method, since the receiving window size is differently established by considering the multipath delay, detection accuracy of the ACK/NACK signal may be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An uplink control channel allocation method, the method comprising:
   allocating, by a device, a first long cyclic prefix;
   allocating a first valid symbol that is provided after the first long cyclic prefix, and is used to transmit an initial ranging signal or a handover ranging signal;
   allocating a second long cyclic prefix that is provided after the first valid symbol,
   allocating a second valid symbol that is provided after the second long cyclic prefix; and is used to transmit a periodic ranging signal or a band request ranging signal;
   allocating a short cyclic prefix that is provided after the second valid symbol, a length of the short cyclic prefix being shorter than a length of each of the first and second long cyclic prefixes; and
   allocating a third valid symbol that is provided after the short cyclic prefix and is used to transmit ACK/NACK information or uplink channel sounding information.

2. The method of claim 1, wherein lengths of the first and second long cyclic prefixes are determined according to round trip delay time and delay spread.

3. The uplink method of claim 1, wherein the first valid symbol and the second valid symbol used are formed by using short orthogonal frequency division multiple (OFDM) symbols, and each short OFDM symbol is obtained by modulating one subcarrier among n subcarriers and establishing the remaining subcarriers of the n subcarriers as null values without modulating them.

4. The method of claim 3, wherein n is a symbol length reduction ratio.

5. The method of claim 1, wherein the first long cyclic prefix is used to prevent interference distortion of the initial ranging signal or the handover ranging signal.

6. The method of claim 1, wherein the second long cyclic prefix is used to prevent interference distortion of the initial ranging signal or the handover ranging signal and the periodic ranging signal or the band request ranging signal.

7. An uplink control channel allocation method, the method comprising:
   allocating, by a device, a first long cyclic prefix;

allocating a first valid symbol that is provided after the first long cyclic prefix and that corresponds to an initial ranging signal or a handover ranging signal, the first valid symbol formed by modulating one subcarrier among n subcarriers and establishing the remaining subcarriers of the n subcarriers as null values without modulating them;

allocating a second long cyclic prefix that is provided after the first valid symbol; and allocating a second valid symbol that is provided after the second long cyclic prefix and that corresponds to a periodic ranging signal or a band request ranging signal.

8. The method of claim 7, further comprising determining lengths of the first and second cyclic prefixes according to round trip delay time and delay spread.

9. The method of claim 7, wherein the second valid symbol is formed by modulating one subcarrier among n sub-carriers and establishing the remaining subcarriers of the n subcarriers as null values without modulating them.

10. The method of claim 7, wherein n is a symbol length reduction ratio.

11. The method of claim 7, wherein the first long cyclic prefix is used to prevent interference distortion of the initial ranging signal or the handover ranging signal.

12. The method of claim 7, wherein the second long cyclic prefix is used to prevent interference distortion of the initial ranging signal or the handover ranging signal and the periodic ranging signal or the band request ranging signal.

* * * * *